United States Patent
Bashan et al.

[11] Patent Number: 6,045,043
[45] Date of Patent: Apr. 4, 2000

[54] CONTACT/CONTACTLESS DATA TRANSACTION CARD

[75] Inventors: Oded Bashan, Carmiel; Nehemya Itay, Kibbutz Kfar Giladi; Ronnie Gilboa, Moshav Beit Hillel; Moshe Aduk, Korazim, all of Israel

[73] Assignee: On Track Innovations Ltd., Rosh Pina, Israel

[21] Appl. No.: 09/001,240

[22] Filed: Dec. 30, 1997

[30] Foreign Application Priority Data

Dec. 31, 1996 [IL] Israel .......................... 119943

[51] Int. Cl.⁷ .............................. G06K 19/06; G06K 7/06
[52] U.S. Cl. ........................................... 235/441; 235/492
[58] Field of Search ................................ 235/492, 382.05, 235/382, 375, 487

[56] References Cited

U.S. PATENT DOCUMENTS

| | | |
|---|---|---|
| 5,122,646 | 6/1992 | Taeymans et al. . |
| 5,206,495 | 4/1993 | Kreft . |
| 5,773,812 | 6/1998 | Kreft .......................... 235/492 |
| 5,847,372 | 12/1998 | Kreft .......................... 235/492 |

FOREIGN PATENT DOCUMENTS

| | | |
|---|---|---|
| 0 534 559 | 3/1993 | European Pat. Off. . |
| 43 10 334 | 10/1994 | Germany . |
| 96 38814 | 12/1996 | WIPO . |

*Primary Examiner*—Thien M. Le
*Attorney, Agent, or Firm*—Helfgott & Karas, P.C.

[57] ABSTRACT

A data transaction device having contact and contactless modes of operation, comprises a semiconductor device for operating in contact and contactless modes in accordance with a respective contact or contactless data communications protocol. A contact field includes contacts fixedly connected to the semiconductor device for allowing data transmission between the contacts and the semiconductor device in accordance with the contact data communications protocol, whilst a coil antenna allows contactless data transmission between the coil antenna and the semiconductor device, in accordance with the contactless data communications protocol. An antenna interface coupled to the coil antenna, to the semiconductor device and to at least some of the contacts in the contact field is responsive to an electromagnetic field across the coil antenna for effecting contactless data transmission.

27 Claims, 10 Drawing Sheets

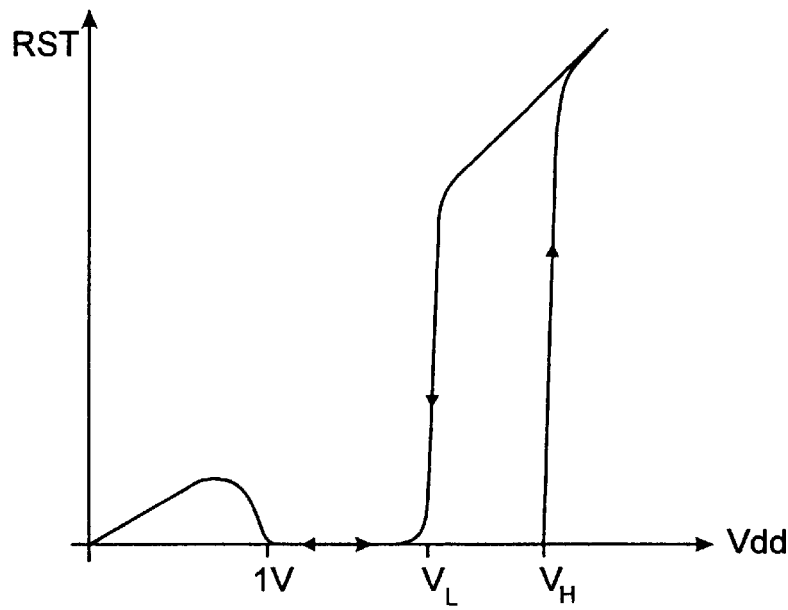

Fig. 4

| MICROPROCESSOR | | ANTENNA INTERFACE | |
|---|---|---|---|
| CONTACT MODE | CONTACTLESS MODE | CONTACT MODE | CONTACTLESS MODE |
| Vdd = ⎍<br>RST = ⎍<br>CLK = ⎍⎍⎍⎍<br>$IO_2$ = 0 ⇒ C.M<br>DATA via $IO_1$<br>C.M { data trans-<br>action<br>ISO 7816 | Vdd = ╱<br>RST = ⎍<br>CLK = ⎍⎍⎍⎍<br>$IO_2$ = 1 ⇒ C/L<br>DATA via $IO_2$<br>C/L { data trans-<br>action<br>CONTACTLESS PROTOCOL | Vdd = ⎍<br>RST, CLK = TRISTATE<br>E/M FIELD OFF ⇒ C.M. MODE | Vdd = ╱<br>RST = ⎍<br>CLK = ⎍⎍⎍⎍<br>E/M FIELD ON ⇒ C/L. MODE<br>DATA TRANS-ACTION via $IO_2$ |

Fig. 5

CONTACT/CONTACTLESS DATA TRANSACTION CARD

FIELD OF THE INVENTION

The invention relates to a data transaction device having an on-board processor for effecting both "contact" and "contactless" modes of data transfer.

BACKGROUND OF THE INVENTION

Both "contact" and "contactless" devices are known per se. Generally, such devices are in the form of smart cards provided either with electrical contacts for effecting direct electrical contact with a card reader; or else they are provided with a coil antenna for effecting contactless bi-directional communication with a remote card reader. U.S. Pat. No. 5,206,495 for a Chip Card in the name of H.D. Kreft discloses a chip card allowing both contact and contactless communication in a single smart card.

Contactless smart cards are particularly suited for applications, such as mass transport systems, wherein data communication must be effected very is quickly without imposing the overhead incurred in manually introducing the smart card into the slot of a card reader.

U.S. Pat. No. 5,206,495 has as a principal object thereof the provision of a contact/contactless chip card having a microprocessor selectively coupled either to a contact field or to a coil. A further declared feature is that the microprocessor operates according to contact mode protocol (ISO Standard 7816) regardless of the mode of data transfer, such that the microprocessor 14 perceives no difference between contact and contact-free use of the chip card.

Such chip cards employ an on-board microcomputer including memory and processing capability for effecting the desired bi-directional data transmission and data storage. In the case where "contact" data transmission is required, there is provided a so-called "contact field" having a plurality of contacts, each of which is connected to the microcomputer by means of a respective electrical connection. Data transmission with an external reader is then effected by inserting the card into a suitable reader having spring-loaded contacts which bear on respective contacts in the contact field of the chip card.

Alternatively, when contactless data transmission is required, a coil antenna in the chip card is adapted to receive data from and transmit data to a reading device having a similar antenna.

FIG. 1 shows the interconnection of functional elements of the chip card subject of U.S. Pat. No. 5,206,495 and employs the same reference numerals as are used in the description of the U.S. Patent. Thus, a switching element device 2.1 connects either a contact field 3 or a pair of coils 4 and 5 to a semiconductor device 2.

Preferably, the switching element device 2.1 is a multiplexer which serves to select either the coils 4 and 5 or the contact field 3 and feed the data received thereby to the semiconductor device 2. Because the data provided by the switching element device 2.1 to the semiconductor device 2 is the same, whether it originates from or is transmitted via the contact field 3 or the coils 4 and 5, the semiconductor device 2 perceives no difference between contact and contactless use of the chip card 1.

Thus, the interconnection provided by U.S. Pat. No. 5,206,495 allows for a microprocessor conforming to ISO Standard 7816 for "contact" bi-directional data transmission also to be used for "contactless" type data transmission without in any way modifying the microprocessor. On the other hand, such an approach exacts a price in the efficiency of data transfer owing to the inherent differences between contactless data protocols and the ISO 7816 contact protocol, which thus requires that the card include a data conversion facility if the microprocessor is to perceive the same protocol in both contact and contactless modes. The use of two coils is also considered a retrograde step reminiscent of the early U.S. Pat. No. 3,299,424 (Vinding) wherein multiple coils were employed: a trend which has long been abandoned in favor of the use of a single coil only.

Yet a further consideration associated with the increasing use of smart cards is the need to customize each smart card for the particular application for which it is destined. Obviously, the provision of both contact and contactless modes of data transfer increases the card's versatility since the actual mode of data transfer may then be selected according to user requirements. However, in practice, there are many other features associated with smart cards which also must be optimized for each specific application, be it contactless access control or mass transportation or contact mode bank applications and so on.

SUMMARY OF THE INVENTION

It is an object of the invention to provide a data transaction card having contact and contactless modes of operation each conforming to different communications protocols.

It is a further object of the invention, to provide such a data transaction card wherein operating parameters associated with the communications protocols can be set by the manufacturer or user in accordance with customer requirements.

In accordance with a broad aspect of the invention there is provided a data transaction card having contact and contactless modes of operation, comprising:

- a semiconductor device for operating in said contact and contactless modes in accordance with a respective contact or contactless data communications protocol,
- a contact field including contacts fixedly connected to the semiconductor device for allowing data transmission between the contacts and the semiconductor device in accordance with said contact data communications protocol,
- a coil antenna for allowing contactless data transmission between the coil antenna and the semiconductor device, in accordance with said contactless data communications protocol, and
- an antenna interface coupled to the coil antenna, to the semiconductor device and to at least some of the contacts in the contact field and being responsive to an electromagnetic field across the coil antenna for effecting said contactless data transmission.

Preferably, the antenna interface includes a bi-directional communications interface including a demodulator for amplitude demodulating an electromagnetic field across the coil so that, in contactless mode, the electro-magnetic field functions as a modulated carrier wave allowing the data to be extracted therefrom. Alternatively, in contact mode data is fed serially via the contacts in the contact field. A loading circuit is included in the antenna interface for loading the coil in contactless mode in response to data fed thereto by the microprocessor, allowing the carrier wave to be amplitude modulated with the data.

Preferably, the semiconductor device is a microprocessor having suitable input/output (i/o) ports and data is fed thereto in contact and contactless modes by different i/o ports. This enables the contacts in the contact field to be fixedly connected to the microprocessor, data being selected, by default, from the coil if an electromagnetic field is detected across the coil by the demodulator in the antenna interface; and data being selected from the contact field otherwise.

The semiconductor device and the antenna interface may, if desired, be integrated on a single chip.

BRIEF DESCRIPTION OF THE DRAWINGS

In order to understand the invention and to see how the same may be carried out in practice, a preferred embodiment will now be described, by way of a non-limiting example only, with reference to the accompanying drawings, in which:

FIG. 4 shows the effect of hysteresis on the reset voltage, RST;

FIG. 5 is a table comparing control signals and data flow in the microprocessor and the antenna interface for contact and contactless mode, respectively;

DETAILED DESCRIPTION OF A PREFERRED EMBODIMENT

Figure 2:
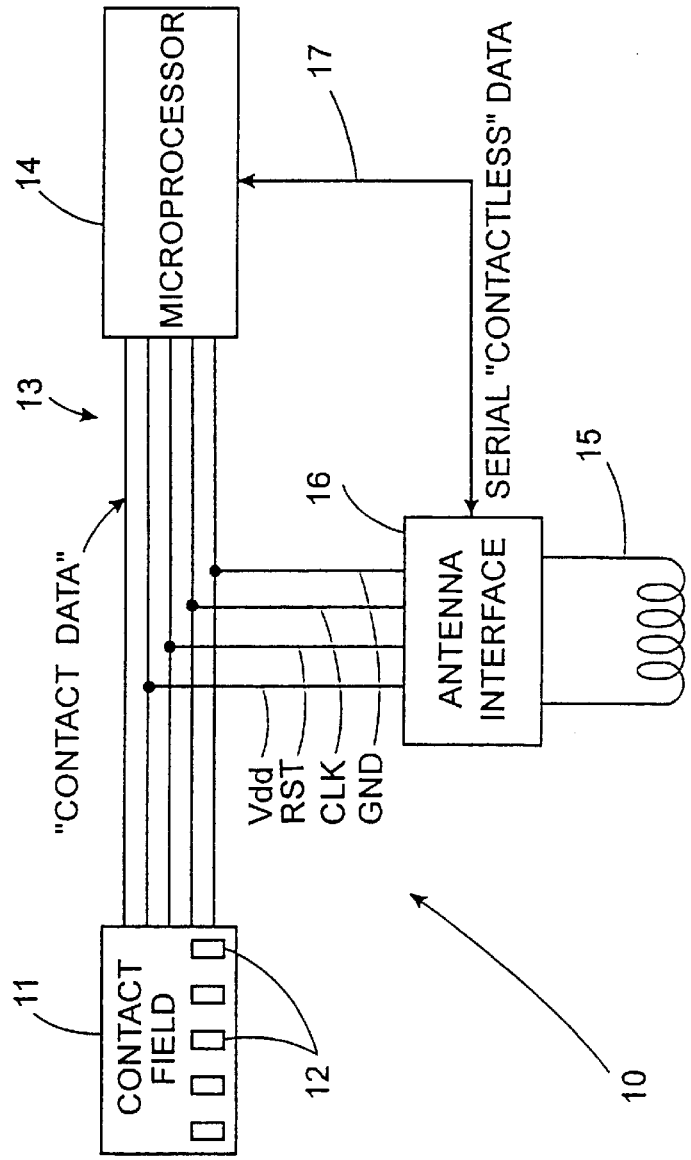
FIG. 2 shows functionally the data transaction card according to the invention.

FIG. 2 shows the structural interconnection of a data transaction card 10 according to the invention and having both "contact" and "contactless" modes of bi-directional data transmission. There is provided a contact field 11 having a plurality of contacts each of which is connected by a separate line 13 to a microprocessor 14. Associated with the microprocessor 14 are processing and memory capability as is known in smart cards and described, for example, in our U.S. Pat. No. 5,241,160 the contents of which are incorporated herein by reference. Typically, six or eight contacts are provided of which five are typically active as standard in the contact field 11 and each of these is connected by a separate line 13 to the microprocessor 14.

Non-contact bi-directional data transmission is effected by a coil 15 which is connected to four of the lines 13 via an antenna interface 16 and which allow for specific features of the microprocessor 14 to be controlled. Data itself is transmitted serially via a fifth line 17 between the antenna interface 16 and the microprocessor 14.

Figure 1:
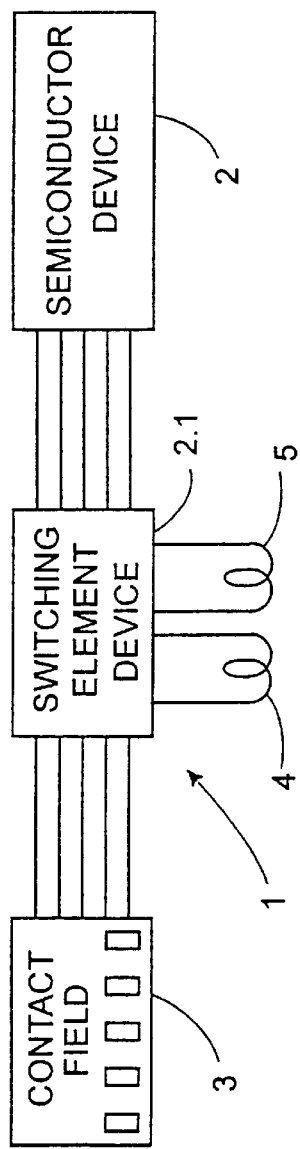
FIG. 1 shows functionally a prior art chip card having contact and contactless modes of operation.

It is thus to be noted that the contact field 11 is permanently connected to the microprocessor 14 as distinct from the prior art configuration described above with reference to FIG. 1 wherein the contact field 3 is connected to the semiconductor device 2 only when switched thereto by the switching element device 2.1.

In order to select properly the required mode of operation, the microprocessor 14 is programmed to recognize an initial state at "power on" corresponding to the presence or absence of an electromagnetic field induced in the coil 15. This, of course, can provide an indication as to whether data is to be transmitted in contactless mode, in which case the microprocessor 14 ignores any data on the line 13 transmitted thereto in "contact" mode and decodes any incoming data transmitted in "contactless" mode according to a predetermined communications protocol. Alternatively, data is transmitted from the memory in the microprocessor 14 to an external reader in "contactless" mode via the coil antenna 15 using the appropriate communications protocol.

Such an arrangement thus enables separate communications protocols to be employed for the bi-directional transmission of data in "contact" and "contactless" mode. Since employing the unmodified ISO Standard 7816 for "contactless" data transmission is unsuitable, this means that a microprocessor which has been pre-programmed for data transmission in "contact" mode using the ISO Standard 7816 is not suitable for direct bi-directional data transmission in "contactless" mode without further modification.

Figure 3:
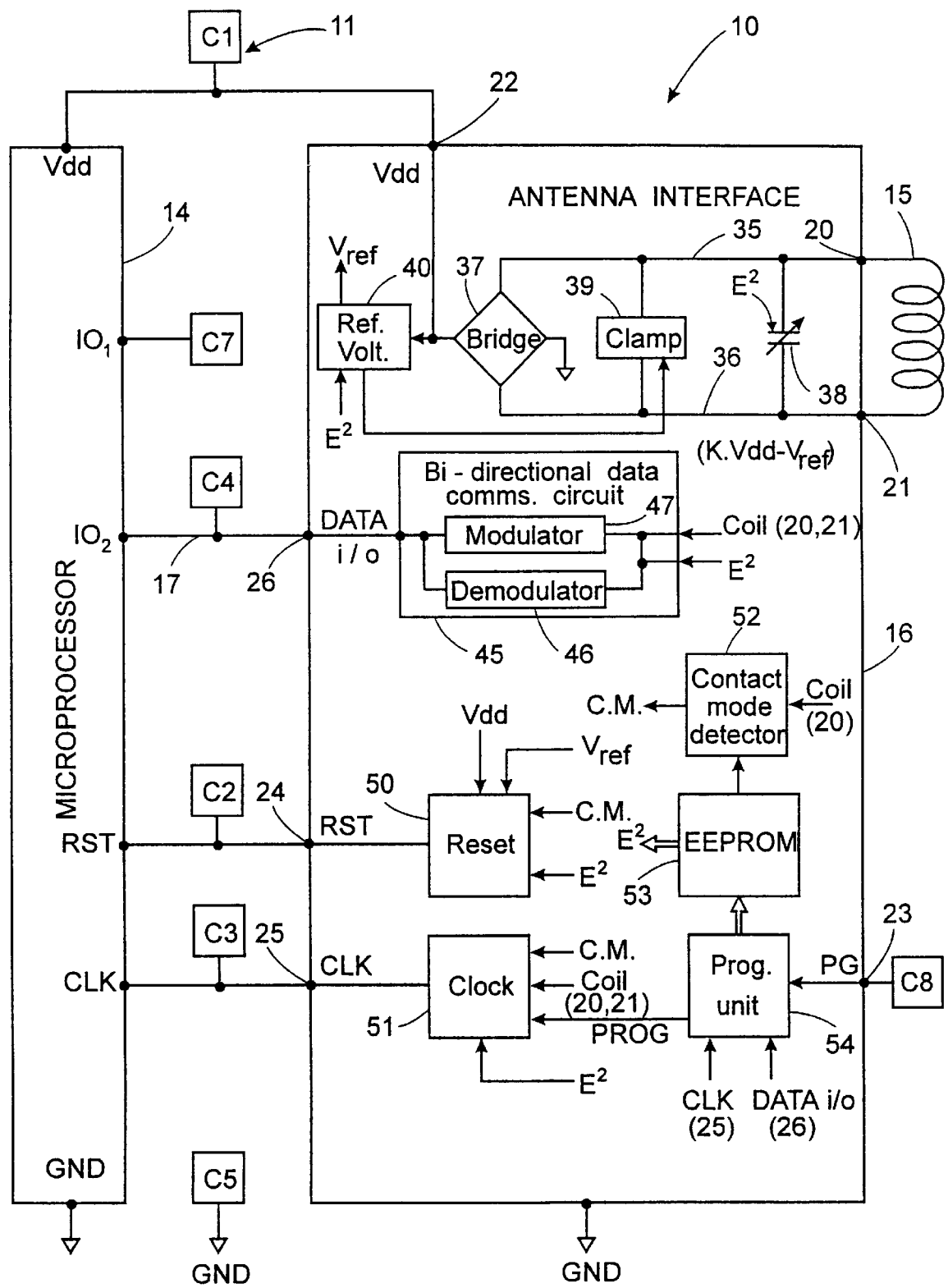
FIG. 3 shows schematically a detail of the data transaction card shown functionally in FIG. 2.

FIG. 3 shows in greater detail the system 10 comprising the contact field 11 having contacts labeled C1 through C5, C7 and C8. The contact C1 is connected to the voltage supply input Vdd of the microprocessor 14 which has a pair of i/o ports $IO_1$ and $IO_2$ connected to the contacts C7 and C4, respectively, in the contact field 11. The microprocessor also has a reset terminal RST connected to the contact C2 in the contact field 11; and a clock terminal, CLK connected to the contact C3 in the contact field 11. The microprocessor 14 also has a ground terminal, GND connected to the contact C5 of the contact field which is connected to GND.

The antenna interface 16 has a pair of coil connection terminals 20 and 21 for connecting the coil antenna 15 thereto and a voltage supply terminal 22 for connecting to the voltage supply input Vdd of the microprocessor 14 in parallel with the contact C1 in the contact field 11. A ground terminal, GND allows connection of the antenna interface 16 to the GND terminal of the microprocessor 14 in parallel with the ground contact C5 in the contact field 11. A program connection terminal 23 allows connection of the antenna interface 16 to the C8 contact in the contact field 11. A reset connection terminal 24 allows for connection of the antenna interface 16 to a reset port RST of the microprocessor 14 in parallel with the contact C2 of the contact field 11. Likewise, a clock connection terminal 25 allows for connection of the antenna interface 16 to a clock port CLK of the microprocessor 14 in parallel with the contact C3 of the contact field 11. A data i/o terminal 26 allows for connection of the antenna interface 16, via the line 17, to the second i/o port $IO_2$ of the microprocessor 14 (constituting a contactless i/o port thereof) in parallel with the contact C4 of the contact field 11.

Having described the external connections of the antenna interface 16, the internal circuitry thereof will now be described. Connected to the coil connection terminals 20 and 21 are AC voltage rails 35 and 36 for feeding an AC voltage thereacross when the coil antenna 15 is inductively coupled to an electromagnetic field, such as described in our above-mentioned U.S. Pat. No. 5,241,160.

Coupled across the AC voltage rails 35 and 36 is a bridge rectifier 37 whose negative output is connected to GND and whose positive output is connected to the high DC voltage terminal 22 so that when the data transaction card 10 is in contactless mode and a sufficiently strong electromagnetic field is induced across the coil antenna 15, a sufficiently high DC voltage level is produced by the bridge rectifier 37 for supplying power to the microprocessor 14 in parallel with the contact C1 in the contact field 11.

Coupled across the AC voltage rails 35 and 36 is a tuning capacitor 38 whose capacitance may be varied as will be explained in greater detail below. Together with the coil antenna 15 the tuning capacitor 38 constitutes a resonant circuit whose resonant frequency is thus adjustable by altering the capacitance of the tuning capacitor 38.

The voltage appearing across the supply rails 35 and 36 is dependent on the strength of the electromagnetic field induced across the coil antenna 15 and this, in turn, depends on the strength of the external electromagnetic field as well as the proximity of the coil antenna 15 thereto. In order to ensure that the voltage thus developed across the supply rails 35 and 36 is never too large to damage the microprocessor 14, there is connected across the supply rails 35 and 36 a clamp 39 which ensures that the voltage across the supply rails 35 and 36 may not exceed a predetermined threshold, $V_{MAX}$. The high DC output Vdd of the bridge rectifier 37 is fed to the input of a reference voltage generator 40 which generates at an output thereof a voltage reference $V_{REF}$ which serves as the reference voltage for the remaining circuitry in the antenna interface. The voltage reference $V_{REF}$ is fed back to the clamp 39 so as to feed thereto a control voltage equal to $k \cdot Vdd - V_{REF}$ for controlling the clamp threshold $V_{MAX}$, thus enabling the maximum d.c. supply voltage to be suited to different operating environments.

In order to allow for the bi-directional transfer of data in contactless mode, the antenna interface 16 includes a bi-directional data communications circuit 45 connected across the AC voltage rails 35 and 36 and having an output connected to the data i/o connection terminal 26. The bi-directional data communications circuit 45 contains therein a demodulator 46 for decoding the strength of the electromagnetic field across the coil antenna 15 so as to extract data modulated thereon by a remote reader (not shown). Likewise, in order to modulate the electromagnetic field with data to be sent by the data transaction card 10 to the remote reader, the bi-directional data communications circuit 45 includes a modulator 47 for loading the coil antenna 15 responsive to data to be superimposed on the carrier signal constituted by the electromagnetic field. The demodulator 46 as well as the modulator 47 may be conventional circuits well known in the field of smart card technology such as, for example, described in our above-mentioned U.S. Pat. No. 5,241,160.

The demodulator 46 as well as the modulator 47 may equally well be other known circuits as used in the field of smart card technology. Thus, the modulation and demodulation schemes also contemplate the use of Manchester or Miller coding, for example; as well as the use of a sub-carrier modulated with the data using either Manchester or bi-phase shift keying (BPSK) schemes. At low to medium data transfer rates, the data bit code/decode operation may be performed directly by software within the microprocessor 14. At higher data transfer rates, conventional circuits well known in the field of communication electronics, preferably based on a timing signal derived from the frequency of the induced electromagnetic signal, may be employed to effect the desired data bit coding and decoding.

A reset circuit 50 has an output RST connected to the reset connection terminal 24 of the antenna interface for effecting different resets according to whether the data transaction system 10 is in contact mode or contactless mode. The reset circuit 50 is fed voltage from the high voltage DC rail Vdd and is responsive to the reference voltage $V_{REF}$ and to a mode status flag CM indicating whether the data transaction system 10 is operating in contact mode or contactless mode.

Timing signals to the microprocessor 14 are provided by means of a clock 51 having an input coupled to the AC voltage rails 35 and 36 so as to be responsive to the frequency of the electromagnetic field across the coil antenna 15 for providing the required timing signals. The clock circuit 51 like the reset circuit 50 described above, is responsive to the mode status flag CM and has a further input connected to a programming signal PROG as will be described in greater detail below.

In order to provide the required mode status flag CM which is fed to the reset circuit 50 and the clock 51, there is provided a mode detector 52 having an input connected to the high voltage rail 35 so as to detect the presence of the electromagnetic field across the coil antenna 15 when the data transaction system 10 is in contactless mode. In this case, the output CM of the mode detector 52 is set to logic "0"; otherwise it is set to logic "1".

Operation of the antenna interface 16 may be controlled and customized by means of an EEPROM 53 and a programming unit 54. The programming unit 54 is connected to the EEPROM 53 so as to allow desired programming and data signals to be fed to the EEPROM 53. Specifically, during an initial programming stage, a voltage of 5 V is fed to the PG terminal 23 of the antenna interface 16 via the contact C8 in the contact field 11 when data is to be programmed into the programming unit 54. During a subsequent "burn in" stage, an elevated voltage of 12 V is fed thereto when the data is to be written to the EEPROM 53. The programming unit 54 receives timing signals CLK from the clock 51 and has a data input connected to the data i/o terminal 26 so as to allow external data to be fed thereto via the contact C4 in the contact field 11. Different $E^2$ outputs of the EEPROM 53 are fed to the tuning capacitor 38, the reference voltage generator 40, the bi-directional data communications circuit 45, the reset circuit 50 and the clock 51. Likewise, in order that the output CM may be set to a desired logic level regardless of the presence or absence of the electromagnetic field across the coil antenna 15, the mode detector 52 is also responsively coupled to the EEPROM 53 so that its status can be programmed. This is explained in greater detail below with reference to FIG. 11 of the drawings.

Different bits of the EEPROM 53 contain control parameters for altering the characteristics of the antenna interface 16. Specifically, two types of control parameter are stored in the EEPROM 53, these being (i) magnitude selection parameters and (ii) enable/disable parameters. The magnitude selection parameters allow for customization and/or optimization of the reference voltage $V_{REF}$, the Vdd threshold sensed by the reset circuit 50, the capacitance of the tuning capacitor 38 and the clock output frequency of the clock 51.

Likewise, circuitry (not shown) within the antenna interface 16 is connected to the output of the EEPROM 53 and is responsive to the enable/disable control parameters so that they can be permanently disabled. The EEPROM 53 thus constitutes an encoding means for encoding whether selected circuit components are to be enabled or disabled. Since, therefore, such modules are not essential components of the antenna interface 16 they have been omitted from FIG. 3 and are described separately below with reference to FIGS. 9 to 12 of the drawings showing different preferred embodiments of the invention.

Programming of the EEPROM 53 via the programming unit 54 is accomplished by clocking a data string into a shift register within the programming unit 54 via the data i/o contact C4. The programming data is fed serially so as to fill the shift register, whereupon the contents of the shift register are loaded into the EEPROM 53 by applying a 12 volt DC level to the contact C8 in the contact field 11. During this procedure, the clock signal which is fed to the programming unit 54 is not derived by the clock 51 but, rather, is fed externally via the contact C3 in the contact field 11.

The reset circuit 50 effects different resets according to whether the data transaction system 10 is in contact or contactless mode. Specifically, in contact mode the output RST of the reset circuit 50 goes tristate so as to allow the microprocessor reset to be fed externally to the microprocessor 14 via the contact C2 in the contact field 11. In contactless mode, an active LOW reset signal is fed to the microprocessor 14 and the reset condition depends on the level of the high voltage DC rail Vdd in accordance with data stored in the EEPROM 53. Thus, if Vdd is greater than a predetermined threshold $V_{HIGH}$ stored in the EEPROM 53, then the output RST goes HIGH. On the other hand, if the value of Vdd is less than a predetermined threshold $V_{LOW}$ stored in the EEPROM 53, then the output RST goes LOW.

FIG. 4 summarizes the relationship between the output RST of the reset circuit 50 as a function of the DC voltage Vdd. Thus, it is noted that as the value of Vdd rises, the reset voltage RST may rise slightly until, at a certain level equal to approximately 1 V, the reset voltage RST falls and remains LOW until Vdd reaches the threshold $V_H$, whereupon the reset voltage RST goes HIGH. As Vdd is now reduced, the value of the reset voltage RST slowly falls in proportion to the fall in Vdd, until Vdd reaches the voltage threshold $V_L$ whereupon the reset voltage RST goes from HIGH to LOW. The difference between the two voltage thresholds $V_H$ and $V_L$ defines the degree of hysteresis associated with the reset circuit 50 and is adjustable in accordance with a control parameter fed by the EEPROM 53 to the reset circuit 50.

The clock 51 creates different clock signals according to whether the data transaction system 10 is in contact or contactless mode. Specifically, if in contact mode, the clock 51 is tristate so as to allow the desired clock signal CLK to be fed externally to the microprocessor 14 via the contact C3 in the contact field 11. In contactless mode, there is fed to the microprocessor 14 a clock signal whose frequency is an integer division of the transmitted carrier signal, the division ratio being variable and set by respective $E^2$ bits in the EEPROM 53.

FIG. 5 shows, in tabular form, a comparison of the control signals and data fed to the microprocessor 14 and the antenna interface 16 in contact mode and contactless mode, respectively. In contact mode, the reset signal RST and the clock signal CLK are fed to the microprocessor 14 via the contacts C2 and C3, respectively, in the contact field 11. In contactless mode, no external signals are fed via the contact C2 and C3 of the contact field 11, and the reset signal RST and the clock signal CLK are produced by the reset circuit 50 and the clock circuit 51, respectively.

The mode status flag CM produced by the mode detector 52 within the antenna interface 16 is set to logic "0" for contactless mode and is set to logic "1" for contact mode. The mode status flag CM is used by the control logic within the antenna interface 16 in order to dictate its manner of operation as will be explained in greater detail below with reference to FIG. 7 of the drawings.

The microprocessor 14 determines which state of operation is required, i.e. contact or contactless, by sampling the second i/o port, $IO_2$ connected to the antenna interface 16. In the event that the data transaction card 10 is inserted into a card reader and data is fed externally to the contact field 11, then this is done through the contact C7 which is connected to the first i/o port $IO_1$ of the microprocessor 14. In this case, no data is seen by the second i/o port, $IO_2$ of the microprocessor 14 which therefore knows that the data transaction system 10 is operating in contact mode. The reverse is true in contactless mode when data is, indeed, fed via the data i/o connection terminal 26 to the contactless i/o port $IO_2$ of the microprocessor 14. It is thus to be noted that both the microprocessor 14 and the antenna interface 16 determine whether to operate in accordance with contact or contactless mode.

In contact mode, the microprocessor 14 receives timing signals externally from the card reader via the contact C3 in the contact field 11. Likewise, in contactless mode, a similar form of clock signal, CLK, is produced by the clock 51 and is fed to the microprocessor 14. So far as the antenna interface 16 is concerned, here again in contactless mode, the clock signal, CLK, is produced by the clock 51, no signal being applied externally to the contact C3 of the contact field 11. On the other hand, in contact mode, the clock signal, CLK, is indeed fed externally via the contact C3 in the contact field 11 and, in order not to interfere with this signal, the output of the clock 51 goes tristate.

In contact mode, data transmission between the contact C7 in the contact field 11 and the microprocessor 14 is effected using a data communications protocol conforming to ISO 7816. In contactless mode, data transmission is effected between the microprocessor 14 and the data i/o connection terminal 26 of the antenna interface 16 using a contactless protocol such as, for example, described in our above-referenced U.S. Pat. No. 5,241,160.

Figure 6:
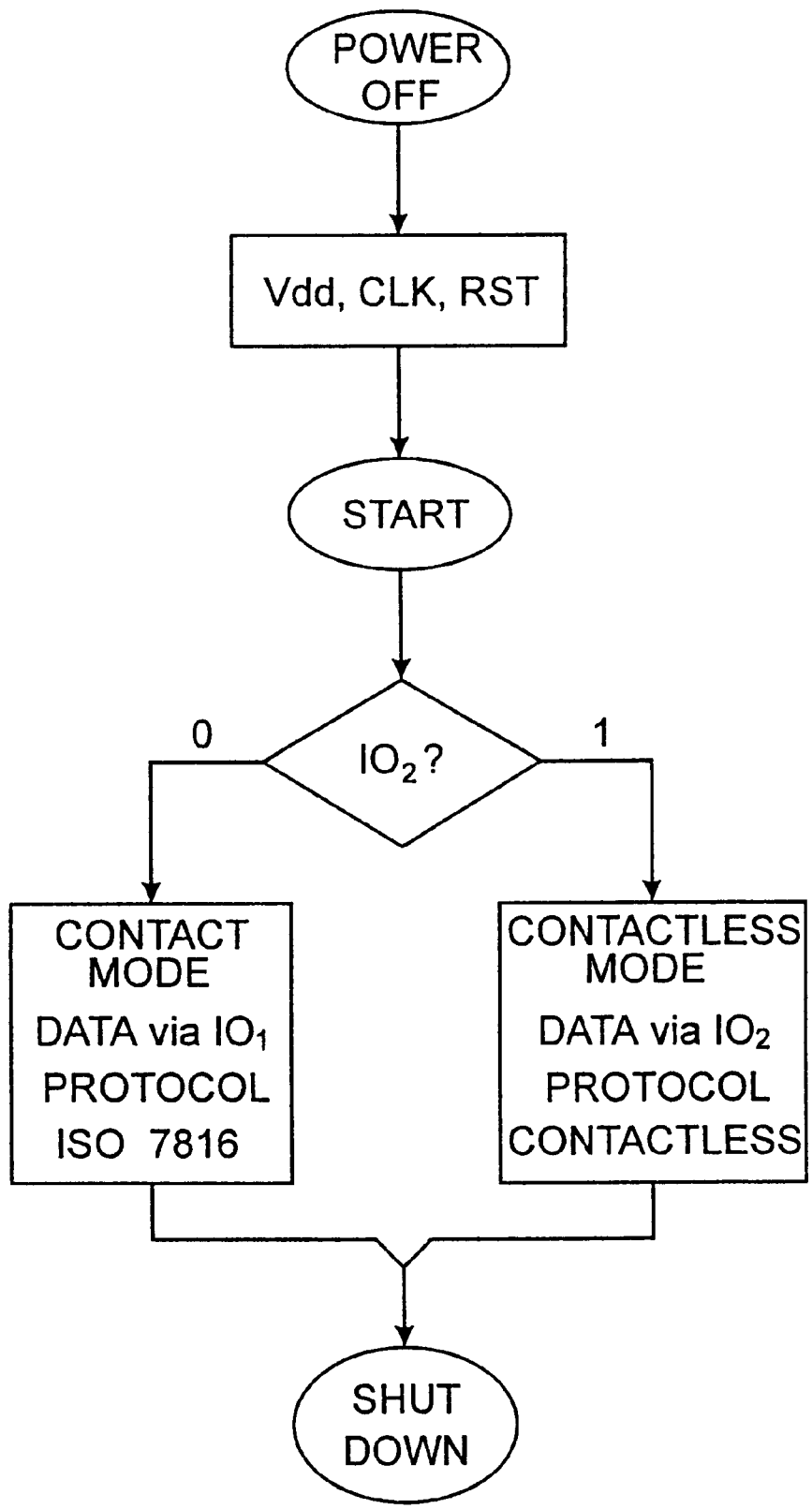
FIG. 6 is a flow diagram showing the principal operating steps on powering up the microprocessor.

FIG. 6 is a flow diagram summarizing the essential operating steps of the microprocessor 14 from an initial "power off" state. Operation of the microprocessor 14 commences when all three of the Vdd, CLK and RST signals are fed thereto either via the appropriate contacts in the contact field 11 or, alternatively, via the antenna interface 16. Upon "power on", the second data i/o port $IO_2$ is sampled, as explained above, in order to determine the presence of an electromagnetic field corresponding to contactless mode or its absence corresponding to contact mode. In the case of contact mode, the microprocessor 14 knows that both incoming and outgoing data is to be channeled via the first data i/o port, $IO_1$ in accordance with a communications protocol conforming to ISO 7816. In the case of contactless mode, the microprocessor 14 knows that both incoming and outgoing data is to be channeled via the second data i/o port, $IO_2$ in accordance with a contactless protocol stored within the microprocessor 14.

Figure 7:
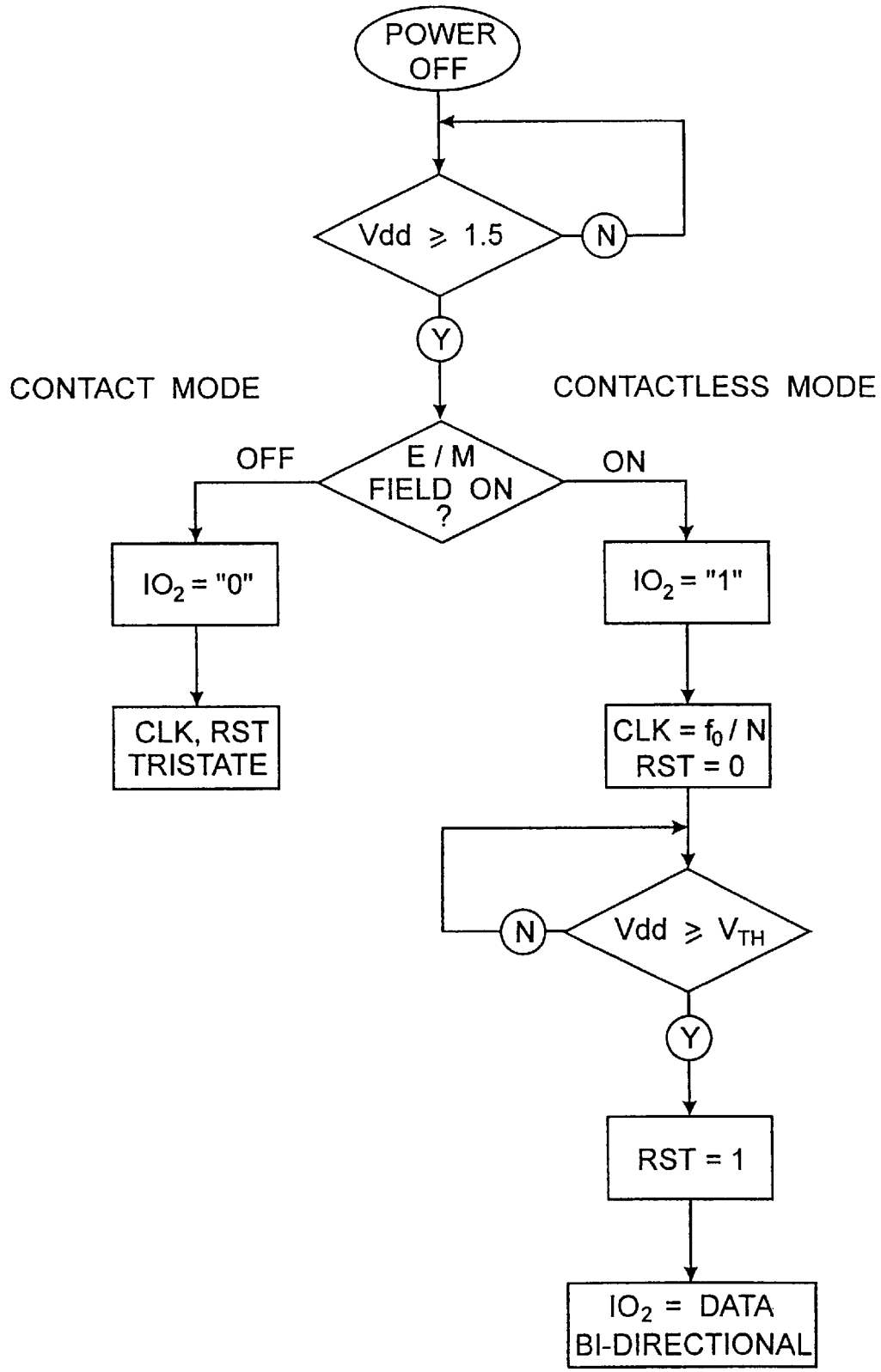
FIG. 7 is a flow diagram showing the principal operating steps associated with powering up the antenna interface.

FIG. 7 is a flow diagram showing the principal operating steps associated with the antenna interface 16 from an initial "power off" state. The value of the D.C. supply voltage Vdd output by the bridge rectifier 37 is constantly sampled and compared with a stored threshold, typically equal to 1.5 V below which there is insufficient voltage to energize the circuitry within the antenna interface 16. When the voltage Vdd climbs above the minimum threshold, the mode detector 52 operates in order to establish whether contact or contactless mode is required. In contact mode, a flag $IO_2$ is set to "0" and as explained above, the clock signal CLK and the reset signal RST are both set to tristate. On the other hand, in contactless mode, the flag $IO_2$ is set to "1", the reset signal RST is set to "0", (i.e. its active LOW level) and the clock output CLK is set to a frequency equal to $f_0/N$ where $f_0$ is the input frequency of the carrier signal typically equal to 13.56 MHz and N is a division factor stored in the EEPROM 53, typically equal to 3, 4, 6 or 8. By such means the clock frequency may be adjusted by the end user according to specific requirements.

Thereafter, the magnitude of the supply voltage Vdd is continually compared with a voltage threshold, $V_{TH}$ whose value is likewise stored in the EEPROM 53 such that when the supply voltage Vdd exceeds the voltage threshold, $V_{TH}$, the reset signal, RST, goes HIGH, logic "1". The value of the flag $IO_2$ is equal to the data fed thereto via the bi-directional data communications circuit 45.

The two comparisons of Vdd with the minimum threshold voltage of 1.5 V and with the threshold voltage $V_{TH}$ are both performed in the background continuously. They serve to ensure that the antenna interface 16 is only awakened when the voltage Vdd exceeds the minimum threshold of 1.5 V; and that data transmission is effected only when the carrier wave constituted by the electromagnetic wave across the coil antenna 15 is sufficiently strong that the supply voltage Vdd exceeds the minimum voltage threshold $V_{TH}$ which itself is greater than 1.5. As the data transaction card 10 is moved in and out of the external magnetic field, the voltage induced across the coil antenna 15 will vary and it is necessary, therefore, to interrupt data transmission when there is insufficient induced voltage until the induced voltage is again sufficiently large.

It has been noted above that the EEPROM 53 may be programmed so as to allow customization of the antenna interface 16. Specifically, the EEPROM 53 allows for enabling/disabling of the various components within the antenna interface 16 shown functionally in FIG. 3; and allows for selection of the component values where appropriate. ƒa circuit components reduces the current consumption of the data transaction card and is of particular benefit when data is transferred in contactless mode since the range is thereby increased.

Figure 8A:
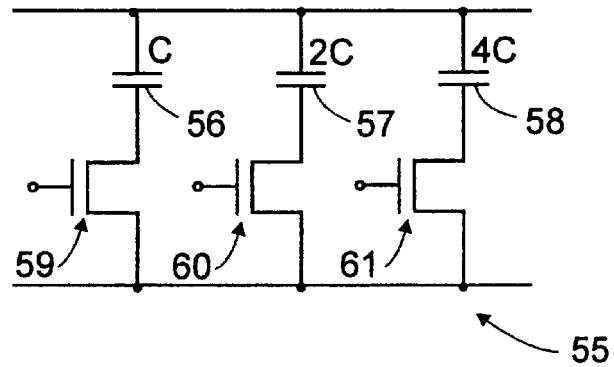
FIGS. 8a shows schematically a circuit for selecting the tuning capacitance of the antenna resonant circuit using the EEPROM.

Reference is now made to FIG. 8a where use of the EEPROM 53 is described for selecting one of eight predetermined values ranging from zero through 7C for the tuning capacitor 38 in the antenna interface 16. The tuning capacitor 38 is implemented by a capacitor bank shown generally as 55 and comprising three capacitors 56, 57 and 58 connected in parallel and having respective capacitances equal to C, 2C and 4C. Thus, by connecting selected ones of the capacitors in circuit, the total capacitance of the capacitor bank 55 may be varied from zero (when none of the capacitors is connected) to 7C (when all the capacitors are connected).

In order to provide the required selection, each of the capacitors 56, 57 and 58 is connected in series with a corresponding MOSFET 59, 60 and 61 whose gate terminals are connected to a respective bit in the EEPROM 53 which thus provides the gate voltage HIGH or LOW for switching each MOSFET on or off. By such means, the corresponding bits in the EEPROM 53 effect enabling or disabling of the capacitors 56, 57 and 58 allowing the capacitance of the capacitor bank 55 to be varied as required. The number of different capacitance levels thus selectable is, of course, equal to $2^N$ where N is the number of capacitors in the capacitor bank 55 having respective capacitances ranging in value from C to $C \cdot 2^{(N-1)}$ and each being selectable by a dedicated bit of the EEPROM 53. By such means, the net capacitance of the capacitor bank 55 may be varied from zero through $C \cdot (2^N - 1)$.

Figure 8B:
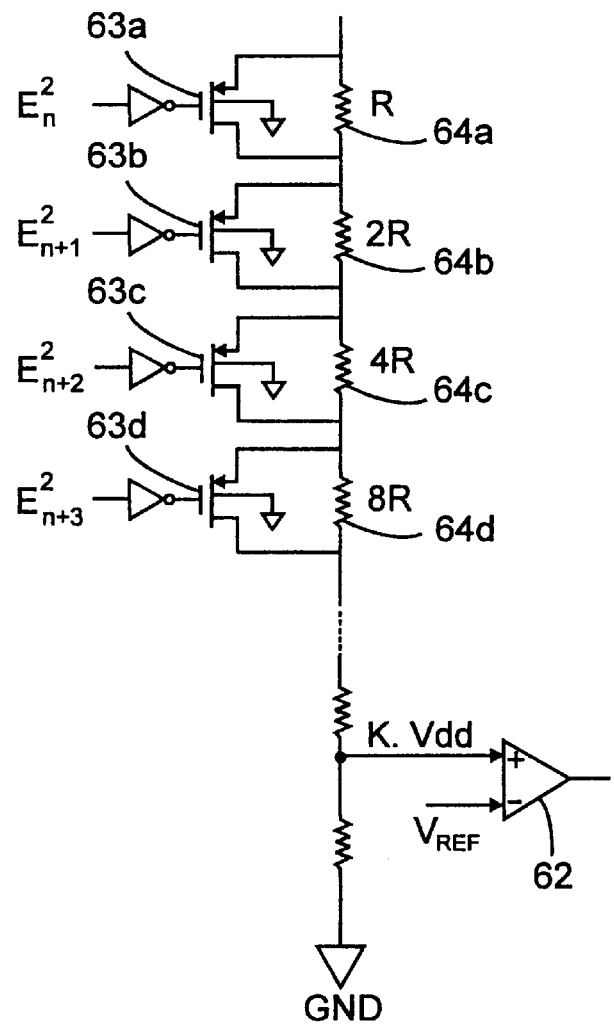
FIGS. 8b shows schematically a circuit for altering the reset level RST of the microprocessor reset signal.

The EEPROM 53 also allows for selection of component values, in effect, by way of switching components in and out of circuit. By way of example, reference is now made to FIG. 8b showing a reset level threshold comparator 62 having a variable and selectable reset level threshold. A ladder network of MOSFETS 63a, 63b, 63c and 63d connected across a voltage divider comprising resistors 64a, 64b, 64c and 64d having values of R, 2R, 4R and 8R, respectively. The comparator 62 has an non-inverting input to which is connected a reference voltage $V_{ref}$ and a inverting input to which a variable reset level threshold k. $V_{dd}$ is applied. The resistors 64a, 64b, 64c and 64d may selectably be shorted by applying a high level logic "1" to the gate of the corresponding MOSFET, thus altering the total resistance of the voltage divider. The factor k is variable depending on which of the resistors 64a, 64b, 64c and 64d in the voltage divider are switched in or out of circuit such that the fraction appearing at the inverting input of the reset level threshold comparator 62 also varies.

By such means the EEPROM 53 allows for factory customization of the antenna interface 16 in accordance with specific end-user requirements. Some examples of the versatility of this approach will now be described with particular reference to FIGS. 9 to 12 of the drawings showing different embodiments of the antenna interface 16. To the extent that the antenna interface 16 comprises identical components to those used in the first embodiment described with reference to FIG. 3, the same reference numerals will now be employed.

Figure 9:
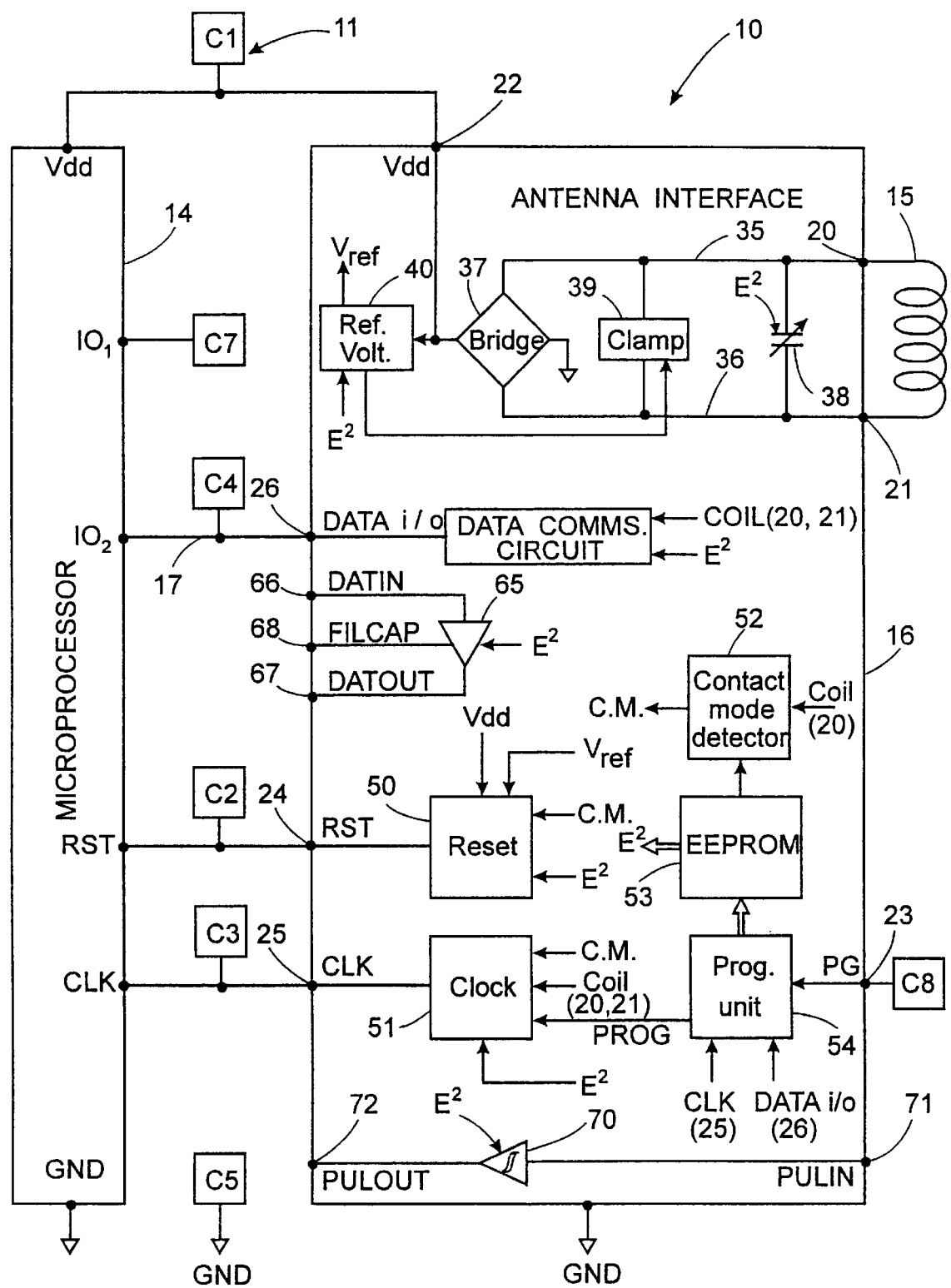
FIG. 9 shows schematically in greater detail the data transaction card shown in FIG. 3.

FIG. 9 shows in greater detail the antenna interface 16 illustrated in FIG. 3 including certain components which are actually disabled. Specifically, there is also shown a self-tracking threshold data amplifier 65 having data in, data out and tracking lines connected respectively to DATIN, DATOUT and FILCAP connection terminals 66, 67 and 68 of the antenna interface 16. Likewise, a pulse amplifier 70 has data in and data out lines connected respectively to PULIN and PULOUT connection terminals 71 and 72 of the antenna interface 16.

Both the self-tracking threshold data amplifier 65 and the pulse amplifier 70 are connected to respective bits of the EEPROM 53, as explained above, so as to allow enabling/disabling thereof during manufacture. Thus, in the embodiment shown in FIG. 3 neither of these components is functional, both being disabled so that the antenna interface 16 shown in FIG. 9 is functionally identical to that shown in FIG. 3.

Figure 10:
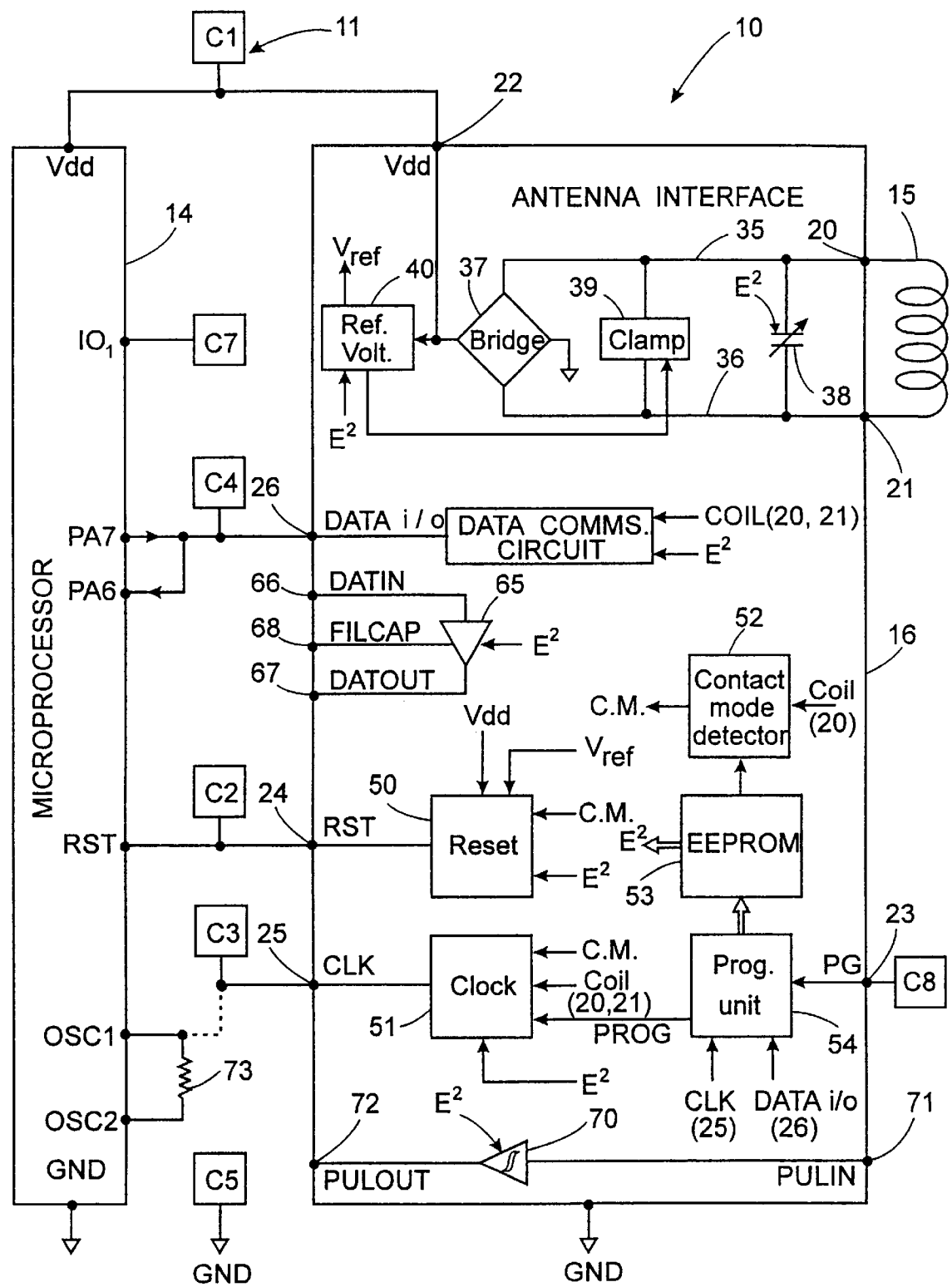
FIG. 10 shows schematically a detail of the data transaction card shown in FIG. 3 in accordance with a second embodiment.

FIG. 10 shows a modification to the antenna interface 16 wherein the DATA i/o connection terminal 26 is connected to respective dedicated data input and output ports of the microprocessor 14 designated PA6 and PA7, respectively, in parallel with the contact C4 in the contact field 11. The microprocessor 14 includes an internal clock connected to first and second oscillator terminals OSC1 and OSC2 and which remains inoperative unless the terminals OSC1 and OSC2 are interconnected by means of a resistor 73 whose resistance determines the internal clock frequency. When the resistor 73 is thus connected, the internal clock runs in free running mode at a frequency $f$ depending on the value of the resistor 73. The basic free-running frequency $f$ of the internal clock is insufficiently accurate to allow frequency-dependent data transfer protocols to be employed and therefore each data string includes a reference bit so as to allow pulse width modulation (PWM) to be employed as described in our U.S. Pat. No. 5,241,160. Use of the internal clock within the microprocessor 14 obviates the need to employ the clock circuit 51 within the antenna interface 16 thus saving power and is of significance because this embodiment is intended for use in contactless mode. The required disabling of the clock circuit 51 is again achieved by selectively switching it in and out of circuit under control of a suitable bit in the EEPROM 53.

As a less-preferred alternative to using the internal clock within the microprocessor 14, the resistor 73 may be dispensed with and the clock connection terminal 25 of the antenna interface 16 connected directly to the first oscillator input OSC1 of the microprocessor 14 in parallel with the contact C3 in the contact field. In this case, the clock signal is provided by the clock circuit 51 within the antenna interface 16.

Since, as noted above, the data transaction card 10 is intended for operation in contactless mode only, current consumption must be minimized in order to increase range. Therefore, both the self-tracking threshold data amplifier 65 and the pulse amplifier 70 are disabled as explained above, since neither is required. Furthermore, the contact field 11 in this embodiment is used only in programming mode in order to feed external data via the contact C4 and the clock signal CLK via the contact C3 to the programming unit 54 whilst setting the correct voltage level to the contact C8.

Figure 11:
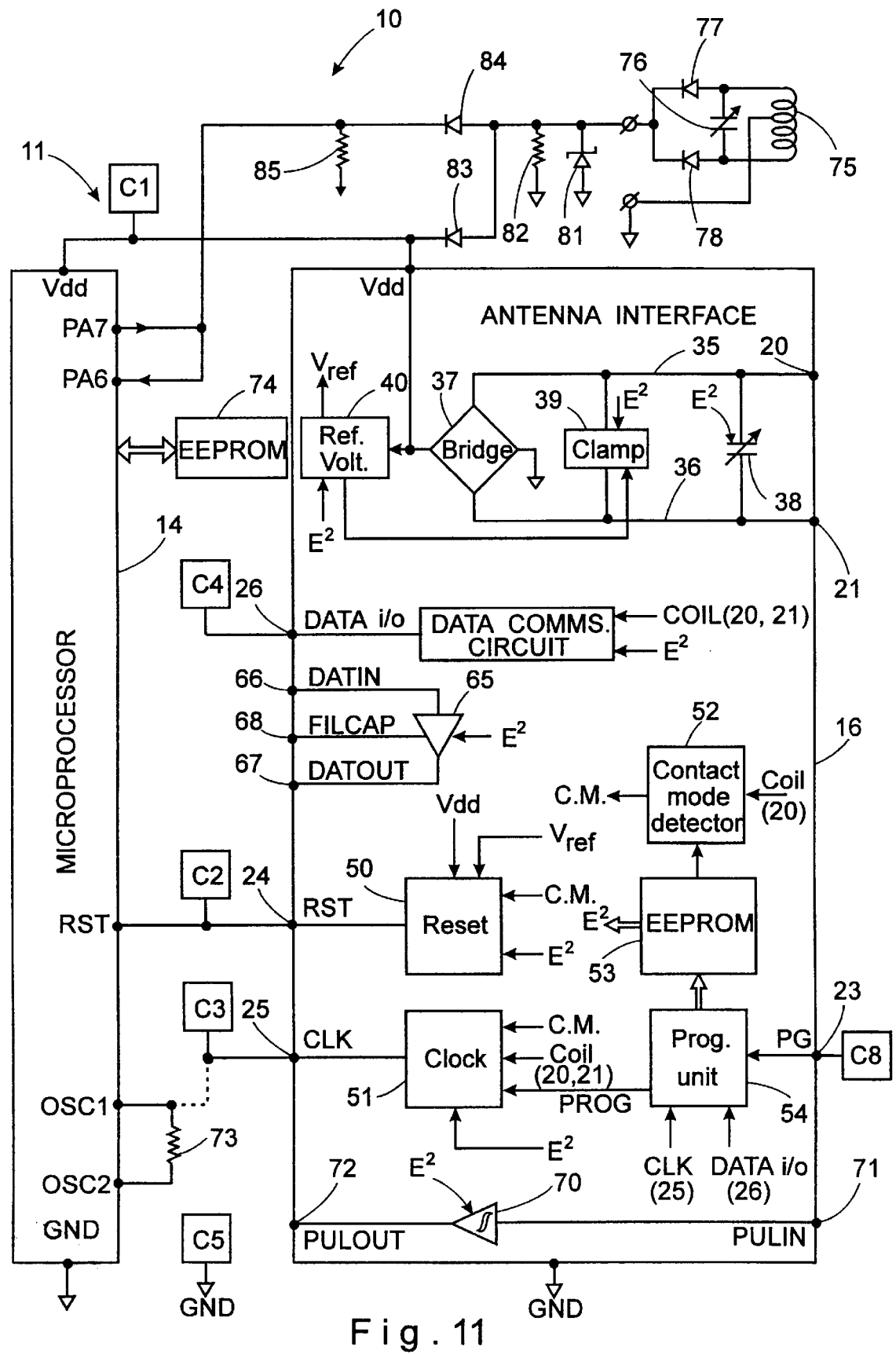
FIG. 11 shows schematically a detail of the data transaction card shown in FIG. 3 in accordance with a third embodiment.

FIG. 11 shows a third embodiment of the antenna interface 16 wherein no coil antenna 15 is connected to the coil connections 20 and 21 and there is connected a remote coil antenna 75 which may be displaced a distance of several meters from the antenna interface 16. This allows the data transaction card 10 to be employed in situations wherein it must be located remote from the coil antenna 75. Such an embodiment is useful, for example, in an automatic gasoline management system wherein the data transaction card 10 is located within a vehicle but the coil antenna 75 must be located remotely therefrom in the vicinity of the vehicle's fuel tank so as to communicate with a reader antenna mounted in association with the fuel nozzle.

In this embodiment, again neither the self-tracking threshold data amplifier 65 nor the pulse amplifier 70 is required and both are therefore disabled. Likewise, since the coil antenna 15 is not functional, the clamp 39 is also disabled. The remote coil antenna 75 is connected in parallel with a tuning capacitor 76 and rectifier diodes 77 and 78. A center-tap of the coil antenna 75 is connected to GND whilst the negative terminals of the rectifier diodes 77 and 78 are commonly connected to an external supply and data rail 80 whose voltage is clipped at 5.1 V by means of a zener diode 81 connected in parallel with a pulldown resistor 82. The external supply and data rail 80 is connected via a rectifier diode 83 to the high voltage DC rail Vdd. Likewise, the external supply and data rail 80 is commonly connected, via a rectifier diode 84 and a pulldown resistor 85, to the data input and output ports of the microprocessor 14, PA6 and PA7, respectively.

It has been explained above that the mode detector 52 is responsive to the presence of an electromagnetic field across the coil antenna 15 for enabling "contactless" mode. This, in turn, enables the reset circuit 50 and the clock 51 which are both responsively coupled to the output of the mode detector 52. In the embodiment shown in FIG. 11 the coil antenna 15 is no longer functional and the data transfer is thus effected in contact mode. However, it is still required that RST and CLK signals be derived from the reset circuit 50 and the clock 51, respectively, since otherwise external RST and CLK signals would have to be supplied via the contact field 11. In order to ensure that the reset circuit 50 and the clock circuit 51 remain active even though the coil antenna 15 is disabled, the mode detector 52 is controlled by means of the EEPROM 53 so as to allow operation in "contactless" mode. This is done using the same technique as has been described for enabling and disabling other functions of the antenna interface 16.

Figure 12:
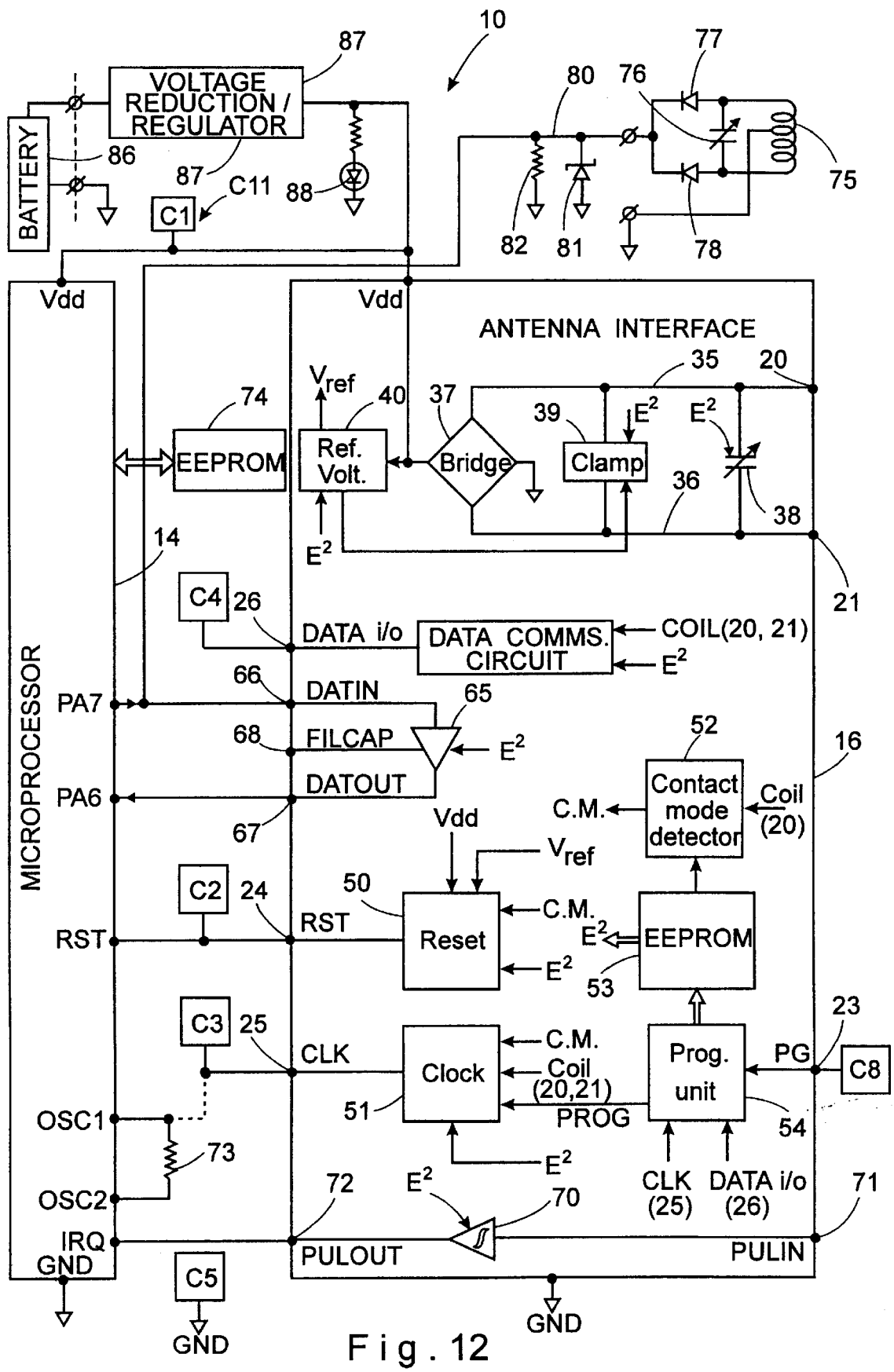
FIG. 12 shows schematically a detail of the data transaction card shown in FIG. 3 in accordance with a fourth embodiment.

Referring finally to FIG. 12, there is shown a further modification to the embodiment shown in FIG. 11 wherein again a remote antenna 75 is provided and no coil antenna 15 is connected to the coil connections 20 and 21. Here also, the data transaction card 10 may find application in an automatic gasoline management system wherein it is required to maintain a record of fuel consumption rate. To this end, pulses from the vehicle's odometer are fed to the PULIN connection terminal 71 of the antenna interface 16 where they are amplified by the pulse amplifier 70. The amplified signal is fed via the PULOUT connection terminal 72 to an interrupt port IRQ of the microprocessor 14.

The signals received by the remote antenna 75 are generally weak and are therefore amplified by the self-tracking threshold data amplifier 65 which is an amplifier/comparator having a self-adjustable threshold level. The output of the self-tracking threshold data amplifier 65 is coupled to the input port PA6 of the microprocessor 14. The output port PA7 of the microprocessor 14 is connected directly to the remote coil antenna 75 so as to transmit data thereby to a reader antenna (not shown) mounted in association with a fuel nozzle (also not shown).

Unlike the embodiment in FIG. 11 wherein the system is passive and is powered via inductive coupling only when the fuel nozzle is inserted into the fuel tank, the system shown in FIG. 12 is active and must remain energized even when not actually being interrogated. To this end, the high voltage DC rail Vdd is connected to a battery 86 within the vehicle via a conventional voltage reduction and regulation circuit depicted as 87 and including an indicator lamp 88 for indicating that the circuit is operational.

It is thus apparent that the data transaction card 10 is extremely versatile and may easily be programmed, during manufacture, so as optimally to serve a wide variety of different applications. This versatility derives, in part, from the simultaneous provision of contact and contactless modes of data transfer which may be selected in accordance with whether an electromagnetic field is detected across the card's coil antenna. Moreover, the card's versatility derives from the provision of an EEPROM which is programmed to enable or disable different circuit functions and to vary the values of circuit components so that the same card may be optimized for the specific application for which it is intended.

It will be understood that modifications may be effected without departing from the spirit of the invention. For example, in the preferred embodiment, a loading circuit is coupled to the antenna interface for loading the coil in contactless mode in response to data fed thereto by the microprocessor. However, a decoupling circuit can be used instead and controlled by the microprocessor so as effectively to prevent the tuned antenna circuit from supplying energy to the remaining data carrier circuitry, in response to data generated by microprocessor 14. Such an arrangement is described in detail in our U.S. Pat. No. 5,241,160.

Likewise, it will be appreciated that whilst in the preferred embodiment, data transfer is effected in contact mode using the ISO 7816 protocol, any other suitable protocol may be employed.

It will also be appreciated that, whilst the preferred embodiment has been described with reference to amplitude modulation of the carrier signal due to loading of the card, in practice such loading also gives rise to phase modulation of the carrier signal. Thus, the reader may also detect the change in phase of the carrier signal relative to its own master clock so as to improve the accuracy with which data is read from the card.

It should also be noted that, whilst in the preferred embodiment, the encoding means is implemented by means of an EEPROM, any other suitable means may be employed. For example, a DIP switch or fusible jumpers may be used in addition or instead.

It will be clear that the data card according to the invention differs over hitherto proposed data cards also in that, in the invention, data may be present on the contact field even when data is present on the coil antenna. In such a situation the microprocessor may be programmed to relate to the data on only one of the data lines or on both data lines simultaneously according to a predetermined protocol.

It will further be understood that whilst the invention has been described with particular reference to a data transaction device in the form of a card, any other suitable device is contemplated within the framework of the invention as defined in the appended claims. Likewise, such a device need not be a standalone module but may, if desired, be integrated with other hardware which may or may not be portable.

We claim:

1. A data transaction card having contact and contactless modes of operation, comprising:
    a semiconductor device for operating in said contact and contactless modes in accordance with a respective contact or contactless data communications protocol,
    a contact field including contacts fixedly connected to the semiconductor device during both said contact and contactless modes, and allowing data transmission between the contacts and the semiconductor device in accordance with said contact data communications protocol only during said contact mode,
    an antenna coil for allowing contactless data transmission between the antenna coil and the semiconductor device, in accordance with said contactless data communications protocol, and
    an antenna interface coupled to the antenna coil, to the semiconductor device and to at least some of the contacts in the contact field and being responsive to an electromagnetic field across the coil for effecting said contactless data transmission.

2. The data transaction device according to claim 1, wherein the semiconductor device has separate contact and contactless i/o ports for effecting data transmission in accordance with said contact and contactless data communications protocol, respectively.

3. The data transaction device according to claim 2, wherein the semiconductor device is responsive to a voltage level of the contactless i/o port on "power up" for selecting which of said communications protocols to enable.

4. The data transaction device according to claim 1, wherein:
    the semiconductor device is provided with clock, power and reset ports which are commonly connected to respective clock, power and reset connections in the contact field and antenna interface, respectively, and
    the clock, power and reset ports of the semiconductor device receive respective clock, power and reset signals via the contact field in said contact mode and via the antenna interface in said contactless mode.

5. The data transaction device according to claim 4, wherein in said contact mode the antenna interface is inactive and in said contactless mode the antenna interface is responsive to the electromagnetic field for supplying power to the semiconductor device.

6. The data transaction device according to claim 4, wherein in said contact mode the antenna interface is inactive and in said contactless mode the antenna interface is responsive to the electromagnetic field for supplying a clock signal to the semiconductor device.

7. The data transaction device according to claim 4, wherein in said contact mode the antenna interface is inactive and in said contactless mode the antenna interface is responsive to the electromagnetic field for supplying a reset signal to the semiconductor device.

8. The data transaction device according to claim 1, wherein the antenna interface is responsive to a voltage level across the coil antenna on "power up" for selecting in which of said modes to operate.

9. The data transaction device according to claim 3, wherein:
    the electromagnetic field is an amplitude modulated data carrier having superimposed thereon data to be read by the data transaction device,
    the i/o port of the antenna interface is coupled to the contactless i/o port of the semiconductor device for allowing said contactless data transfer, and
    the antenna interface includes a demodulator for amplitude demodulating data superimposed on the carrier, said demodulator having a demodulator input coupled to said coil antenna and a demodulator output coupled to said data i/o port for producing at said demodulator output a signal having a voltage level corresponding to said superimposed data.

10. The data transaction device according to claim 3, wherein:
    the electromagnetic field is an amplitude and/or phase modulated data carrier having superimposed thereon data to be written by the data transaction device to a remote device,
    the contactless i/o port of the semiconductor device is coupled to a data i/o port of the antenna interface for effecting said contactless data transmission, and
    the antenna interface comprises a modulator including a loading circuit having a loading circuit input coupled to the data i/o port and a loading circuit output coupled to the coil antenna for loading the coil antenna in response to said data fed to the loading circuit input by the semiconductor device.

11. The data transaction device according to claim 3, wherein:
    the electromagnetic field is an amplitude and/or phase modulated data carrier having superimposed thereon data to be written by the data transaction device to a remote device,
    the contactless i/o port of the semiconductor device is coupled to a data i/o port of the antenna interface for effecting said contactless data transmission, and the antenna interface comprises a modulator including a decoupling circuit controlled by the semiconductor device so as effectively to decouple the coil antenna from the antenna interface in response to data generated by the semiconductor device.

12. The data transaction device according to claim 1, wherein the data transmission is bi-directional.

13. The data transaction device according to claim 3, wherein:

the data transmission is bi-directional, the contactless i/o port of the semiconductor device is coupled to a data i/o port of the antenna interface for effecting said contactless data transmission, and the antenna interface includes:

a demodulator for amplitude demodulating data superimposed on the carrier, said demodulator having a demodulator input coupled to said coil antenna and a demodulator output coupled to said data i/o port for producing at said demodulator output a signal having a voltage level corresponding to said superimposed data, and a modulator including a loading circuit having a loading circuit input coupled to the data i/o port and a loading circuit output coupled to the coil antenna for loading the coil antenna in response to data fed to the loading circuit input by the semiconductor device.

14. The data transaction device according to claim 3, wherein:

the data transmission is bi-directional, the contactless i/o port of the semiconductor device is coupled to a data i/o port of the antenna interface for effecting said contactless data transmission, and the antenna interface includes:

a demodulator for amplitude demodulating a signal representative of data superimposed on the carrier, said demodulator having a demodulator input coupled to said coil antenna and a demodulator output coupled to said data i/o port for producing at said demodulator output a signal having a voltage level corresponding to said superimposed data, and a modulator including a decoupling circuit controlled by the semiconductor device so as effectively to prevent the antenna interface from supplying energy to the remaining circuitry in the data transaction device, in response to data generated by the semiconductor device.

15. The data transaction device according to claim 10, wherein the modulator is responsive to a signal representative of data bits fed thereto by the semiconductor device for producing at an output thereof an encoded signal corresponding to a selected encoding scheme.

16. The data transaction device according to claim 9, wherein the demodulator further includes means for decoding a signal representative of individual bit bits of said data so as to produce at said demodulator output a signal representative of said data.

17. The data transaction device according to claim 1, wherein the antenna interface further includes integral customizing means for customizing and/or optimizing the antenna interface for a specific application.

18. The data transaction device according to claim 17, wherein the customizing means includes an encoding means in respect of different circuit components in the antenna interface for encoding whether said circuit components are to be enabled or disabled.

19. The data transaction device according to claim 17, wherein the encoding means is adapted to connect together several circuit elements in the antenna interface in a predetermined configuration.

20. The data transaction device according to claim 17, wherein the customizing means includes an encoding means operatively coupled to a tuning capacitor within the antenna interface comprising a plurality of component capacitors selectably connectable in parallel under control of the encoding means so as to modify a net capacitance of the tuning capacitor.

21. The data transaction device according to claim 17, wherein the customizing means includes an encoding means for encoding selection parameters in respect of different circuit components in the antenna interface so as to allow values of said circuit components to be selected.

22. The data transaction device according to claim 1, wherein the antenna interface includes:

a mode detector for sensing a presence or absence of an electromagnetic field across the coil antenna for producing respective contactless and contact mode signals, a reset circuit responsively coupled to the mode detector and being responsive to the contactless mode signal for feeding a reset signal RST to a reset port of the semiconductor device, and a clock circuit responsively coupled to the mode detector and being responsive to the contactless mode signal for feeding a clock signal CLK to a clock port of the semiconductor device.

23. The data transaction device according to claim 22, wherein the antenna interface further includes customization means for producing said contactless mode signal even in the absence of an electromagnetic field across the coil antenna, whereby the clock and reset circuits are responsive to the contactless mode signal for feeding the clock and reset signals, respectively, to the semiconductor device even in the absence of an electromagnetic field across the coil antenna.

24. The data transaction device according to claim 1, wherein the contact data communications protocol conforms to ISO 7816.

25. The data transaction device according to claim 2, wherein data may be present on the contact and contactless i/o ports simultaneously, and the semiconductor device is programmed to relate to the data on only one of the data lines or on both data lines simultaneously according to a predetermined protocol.

26. The data transaction device according to claim 1, wherein the semiconductor device and the antenna interface are integrated on a single chip.

27. The data transaction device according to claim 11, wherein the modulator is responsive to a signal representative of data bits fed thereto by the semiconductor device for producing at an output thereof an encoded signal corresponding to a selected encoding scheme.

* * * * *